United States Patent
Bendat

(10) Patent No.: US 10,918,464 B2
(45) Date of Patent: Feb. 16, 2021

(54) ADAPTOR SYSTEM FOR DENTAL PROSTHESIS

(71) Applicant: Jacob Bendat, Gan Yavne (IL)

(72) Inventor: Jacob Bendat, Gan Yavne (IL)

( * ) Notice: Subject to any disclaimer, the term of this patent is extended or adjusted under 35 U.S.C. 154(b) by 0 days.

(21) Appl. No.: 16/008,076

(22) Filed: Jun. 14, 2018

(65) Prior Publication Data

US 2019/0365509 A1    Dec. 5, 2019

Related U.S. Application Data

(63) Continuation-in-part of application No. PCT/IL2016/000025, filed on Dec. 7, 2016.

(51) Int. Cl.
*A61C 8/00* (2006.01)

(52) U.S. Cl.
CPC .......... *A61C 8/0053* (2013.01); *A61C 8/0068* (2013.01); *A61C 8/0054* (2013.01); *A61C 8/0065* (2013.01); *A61C 8/0069* (2013.01)

(58) Field of Classification Search
CPC ... A61C 8/0053; A61C 8/0068; A61C 8/0056; A61C 8/0062; A61C 8/0066
See application file for complete search history.

(56) References Cited

U.S. PATENT DOCUMENTS

| | | | | |
|---|---|---|---|---|
| 4,832,601 A * | 5/1989 | Linden | .......... | A61C 8/005 433/173 |
| 5,092,771 A * | 3/1992 | Tatum, III | .......... | A61C 8/0018 433/173 |
| 5,195,891 A * | 3/1993 | Sulc | .......... | A61C 8/005 433/173 |
| 5,328,371 A * | 7/1994 | Hund | .......... | A61C 8/005 433/173 |
| 6,227,859 B1 * | 5/2001 | Sutter | .......... | A61C 8/005 433/173 |
| 7,300,282 B2 * | 11/2007 | Sapian | .......... | A61C 8/0057 433/169 |
| 8,303,303 B2 * | 11/2012 | Brajnovic | .......... | A61C 8/0001 433/75 |
| 9,522,051 B2 * | 12/2016 | Engman | .......... | A61C 8/0068 |
| 2013/0177873 A1 | 7/2013 | Seo et al. | | |
| 2015/0173864 A1 | 6/2015 | Pomeranitz | | |
| 2019/0365510 A1 * | 12/2019 | Richard | .......... | A61C 8/0048 |
| 2020/0015940 A1 * | 1/2020 | Fischler | .......... | A61C 8/0068 |

* cited by examiner

*Primary Examiner* — Ralph A Lewis

(57) ABSTRACT

The invention relates to an adaptor system for a dental prosthesis. The adaptor system comprises an abutment and an adaptor, wherein said adaptor is adapted to connect to a prior art or new implants and is also connected to the abutment by a rotational connection. The adaptor and the abutment are secured to the implant by a screw that retains the angular position of the abutment.

16 Claims, 3 Drawing Sheets

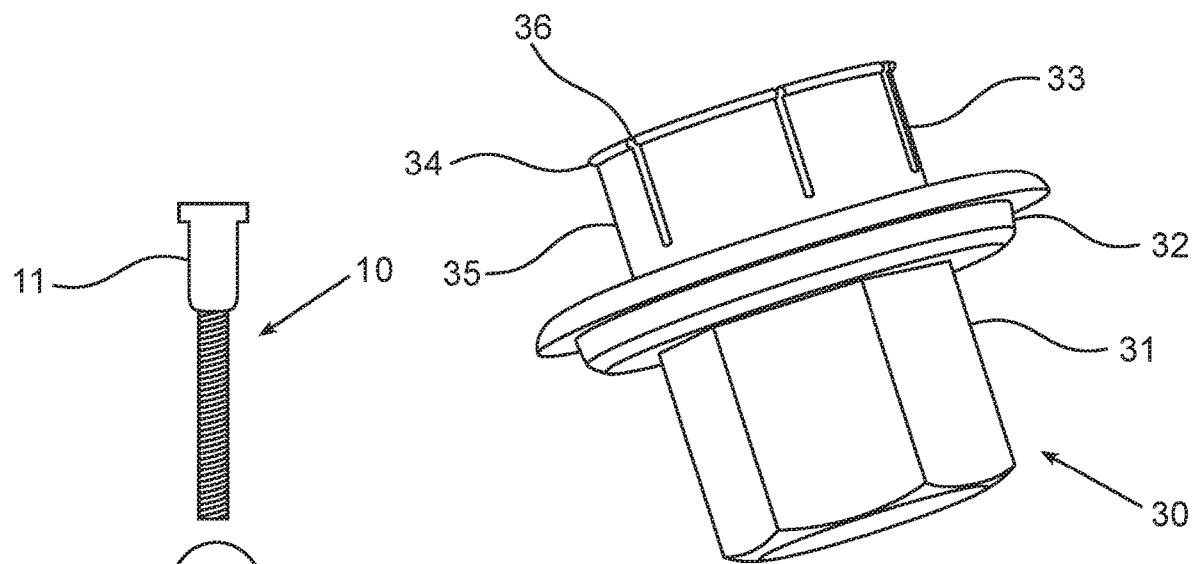
FIG. 2
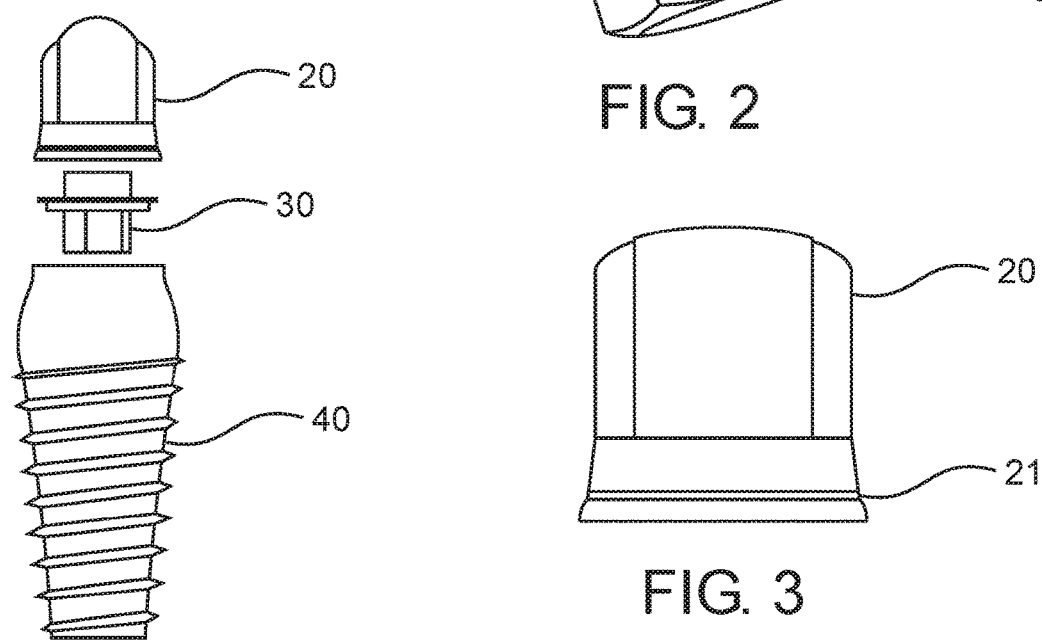
FIG. 3
FIG. 1
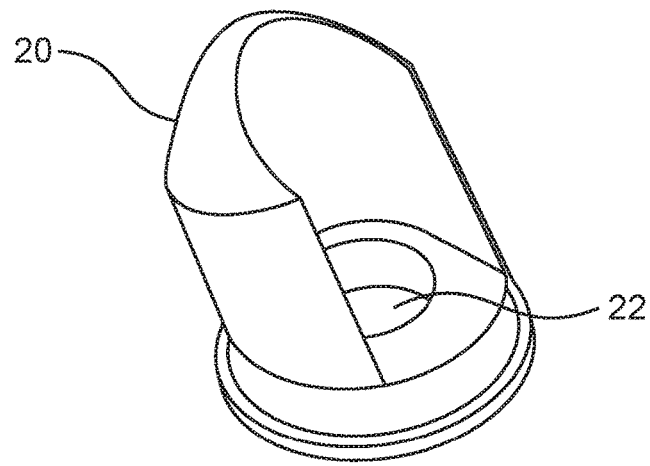
FIG. 4

ADAPTOR SYSTEM FOR DENTAL PROSTHESIS

RELATED APPLICATION/S

This application is a continuation in part of international patent application no. PCT/IL/2016/000025 filed 7 Dec. 2016.

An adaptor system for a dental prosthesis is disclosed. In some embodiments, the adaptor system comprises an abutment and an adaptor. Optionally the adaptor is adapted to connect to a prior art and/or new implants. In some embodiments, the adaptor is connected to the abutment by a rotational connection. Optionally, the adaptor and the abutment are secured to the implant by a screw that retains the angular position of the abutment.

BACKGROUND

Dental implant systems are widely used for replacing damaged or lost natural teeth. In such systems, a dental implant is placed in the jawbone of a patient in order to replace the natural tooth root and to preserve the current rehabilitation of the teeth. An abutment structure comprising one or several parts may then be attached to the implant in order to build up a core for the part of the prosthetic tooth protruding from the bone tissue, through the soft gingival tissue, and into the mouth of the patient. On said abutment, the prosthesis or crown may finally be seated.

The final prosthesis should be sized and configured so as to naturally fit with the remaining teeth of the patient, for both functionality and aesthetics. To this end a dental technician may try out a proper prosthesis for the individual patient, using a model of the jaw of the patient. The dental technician may also digitally work out a proper prosthesis based on a digital model of the jaw of the patient.

Many abutment/implant interfaces are designed with hexagonal protrusions and matching hexagonal recesses. For instance, the abutment may be provided with a hexagonal protrusion that is adapted to mate with a corresponding hexagonal recess in the implant when the two components are to be joined.

Dentists sometimes experience difficulties with axial alignment of the abutment, as the hexagonal protrusion mating with the hexagonal recess allows only six possible axial positions of the abutment. The common abutment with hexagonal protrusion has no adjustment ability and after the abutment placed there is no adjustment ability that allows getting to an accurate placement relating the final desire work.

SUMMARY OF THE INVENTION

According to a first aspect of the invention, an adaptor system for a dental prosthesis is provided. The adaptor system comprises an abutment and an adaptor connected to each other and to an implant by mating connections and a screw. The abutment is connected to the adaptor by a mating connection that allows axial rotation of said abutment when the screw is untightened. This allows a dentist to rotate the abutment to a desired angle for attaching a prosthesis or any other dental structure to it.

According to a second aspect of the invention, a method for aligning a dental abutment is provided. In this method when there is a need to align the abutment to a desired angle, the screw is untightened and the abutment is rotated to a desired axial position. After that the screw is tightened again.

According to an aspect of some embodiments of the invention, there is provided an adaptor system for mounting a dental prosthesis onto an implant including: an abutment; an adaptor including a mating element adapted to irrotationally fit to the implant and a connector configure for connecting to the abutment to the adaptor while allowing rotation of the abutment with respect to the adaptor; and a tightener configured to lock the abutment to the adaptor thereby preventing rotation between the adaptor and the abutment.

According to some embodiments of the invention, the abutment includes an attachment surface adapted for attaching to the prosthesis and wherein the adaptor connects to the abutment opposite the attachment surface.

According to some embodiments of the invention, the abutment includes a first through hole and the adaptor includes a second through hole and wherein a lower part of the tightener is configured to pass through the first and second through hole to connect to the implant.

According to some embodiments of the invention, the connector includes at protrusion fitting to a matching annular groove on an inner surface of the first through hole of the abutment.

According to some embodiments of the invention, the adaptor includes an expanding element and wherein the tightening expands the expanding element against an inner surface of the first through hole and wherein friction between the expanding element and the inner surface prevents the rotation.

According to some embodiments of the invention, the expanding element includes at least two bendable sections separated by a slit.

According to some embodiments of the invention, the lower part includes a first screw thread configured to connect to a matching screw thread of the implant and wherein the tightening includes tightening the first screw thread to the matching screw thread.

According to some embodiments of the invention, the tightener includes a taper on an upper part thereof and wherein the tightening causes the taper to press a surface of the adaptor against the abutment and wherein friction between the surface and the abutment prevents the rotation between the connector and the abutment.

According to some embodiments of the invention, the connector includes at least one member of the group consisting of a protrusion and a groove, and wherein the member fits to a matching element on the abutment.

According to some embodiments of the invention, the connector includes at protrusion fitting to a matching groove on the abutment.

According to some embodiments of the invention, the adaptor includes an expanding element and wherein the tightening expands the expanding element against a surface of the abutment and wherein friction between the expanding element and the surface prevents the rotation.

According to some embodiments of the invention, the mating element includes a protrusion fitting to a recession of the implant.

According to some embodiments of the invention, the protrusion and the recession are hexagonal.

According to some embodiments of the invention, the abutment includes a through hole and wherein an upper part of the tightener includes a taper and wherein a lower part of the tightener includes a screw thread and wherein the tightening includes tightening the screw thread to apply pressure from the taper against an inner surface of the through hole.

According to some embodiments of the invention, the tightener includes a taper and the adaptor includes an expanding portion and wherein the tightening causes the taper to press the expanding portion of the adaptor against an inner surface of a hole through the abutment.

According to an aspect of some embodiments of the invention, there is provided a method of mounting an abutment to a dental implant with an adaptor including: irrotationally mating the adaptor to the implant; connecting the abutment to the adaptor while allowing rotation between the adaptor and the abutment; rotating the abutment with respect to the adaptor to a desired position; and tightening the abutment to lock the adaptor in the desired position and to prevent further rotating of the abutment with respect to the adaptor.

According to some embodiments of the invention, the connecting includes snapping a protrusion into a groove and wherein the rotating includes sliding the protrusion along the groove.

According to some embodiments of the invention, the tightening the abutment to the adaptor includes simultaneously tightening the adaptor to the implant.

According to some embodiments of the invention, the abutment includes a through hole and wherein the tightening includes inserting a lower end of a tightener through the through hole to form a connection between the tightener and the implant and the tightening includes tightening the connection to apply pressure from an upper flange of the tightener against the through hole thereby preventing the further rotating.

According to some embodiments of the invention, the connecting the abutment to the adaptor includes inserting an expanding extension into a hole and wherein the tightening includes expanding the expanding extension against an inner surface of the hole and wherein friction between the expanding extension and the inner surface prevents the further rotating.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

FIG. 1 is an exploded view of the components of at least one embodiment of the invention;

FIG. 2 illustrates an adaptor according to at least one embodiment of the invention;

FIG. 3 illustrates an abutment according to at least one embodiment of the invention;

FIG. 4 illustrates another view of an abutment according to at least one embodiment of the invention;

DETAILED DESCRIPTION

Figure 5:
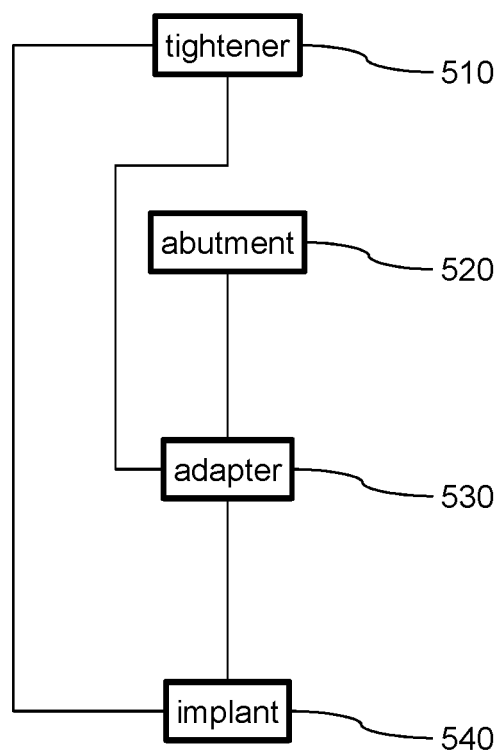
FIG. 5 is a block diagram illustrating an adaptor system for a dental prosthesis in accordance with at least one embodiment of the current invention.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

An object of some embodiments of the invention is to make it possible for dentists to connect a dental component, such as an abutment, to an implant at any axial position. As Optionally, that may allow fitting a prosthesis (such as a dental bridge) without making any adjustments to it, even if the spatial positions of the abutments were changed from the time when the measurements were taken for making the prosthesis. As a result, embodiments of the invention may provide a more accurate and less time-consuming method for dental restorations.

Beginning with FIG. 2, an adaptor 30 according to an embodiment of the invention is illustrated. The adaptor 30 comprises a hexagonal protrusion 31, said hexagonal protrusion 31 is adapted to mate with a hexagonal recession of an implant 40. The adaptor 30 additionally comprises an annular ledge 32 that is adapted to mate with an annular recession of the implant 40 and to cover the top surface of the implant 40. The adaptor 30 additionally comprises a connector 33 with an annular protrusion 34 on its edge. The connector 33 has a cylindrical form and comprises at least two bendable sections 35 separated by a slit 36.

FIG. 3 and FIG. 4 depict an abutment 20 with a through-hole 22 that mates with the connector 33 of the adaptor 30. Additionally, the abutment 20 also comprises an annular groove 21 located on the inner surface of the hole 22. The groove 21 is adapted to mate with the annular protrusion 34 when the connector 33 is inserted into the hole 22. The groove 21 and the protrusion 34 create a so-called snap or "click" connection. The mating between the protrusion 34 and the groove 21 prevents vertical displacement of the abutment 20 while preserving a rotational freedom of said abutment 20.

The adaptor 30 and the abutment 20 are provided with a central through-hole, through which a screw 10 is inserted and connected to an internal thread of the implant 40. The screw 10 comprises a tapered upper part 11 that is adapted to press on the inner surface of the bendable sections 35 of the connector 33, thus creating friction between said bendable sections 35 and the inner surface of the hole 22 of the abutment 20. Said friction prevents a rotation of said screw 10 and abutment 20, and maintains the abutment 20 in the preferred radial position.

The present invention also comprises a method for aligning a dental abutment. Initially, an abutment 20 is connected to an adaptor 30 and both of them are secured to an implant 40 by a screw 10. When there is a need to align the abutment 20 to a desired angle, the screw 10 is untightened and the abutment 20 is rotated to a desired axial position. After that the screw 10 is tightened again.

Although the drawings illustrate dental components provided with mating elements in the form of hexagonal projections and hexagonal recesses, it should be understood that in other embodiments 3, the mating elements of the dental components may have any other forms.

Furthermore, although the drawings illustrate the adaptor 4 as a male component having a protrusion to be inserted into a socket or recession of the implant, other embodiments are also conceivable.

Another great advantage of the embodiment illustrated in FIG. 2 is that you can start the reconstruction from a minimum height of 0.1 mm of the implant head on the other hand the implants starting from 0.5 mm height are effective for the aesthetics of reconstruction. Especially at angles that are also large or wide angle—can be reached at 0.1 mm reconstruction.

FIG. 5 is a block diagram illustration of a system for mounting a dental implant in accordance with an embodiment of the current invention. In some embodiments, an adaptor 530 is configured to attach non-rotationally to an implant 540. For example, adaptor 530 may attach to the implant by standard means. Optionally, a projection of the adaptor 530 may fit a recess in the implant 540 and/or a recess in the adaptor 530 may fit a projection of the implant 540. Optionally the connection between the adaptor 530 and the implant 540 is non-rotational. For example, a projection and/or recess may have a shape that prevents rotation of one with respect to the other. For example, the projection and recess may be hexagonal and/or the projection may have corners that match grooves in the recess.

In some embodiments the system may include an abutment 520. For example, there may be matching connectors for rotatably connecting the abutment 520 to the adaptor 530. For example, on the adaptor 530, the connector to the abutment 520 may be opposite the connector to the implant 540. For example, on the abutment 520, the connector to the adaptor 530 may be opposite a surface for connection to prosthesis.

In some embodiments, the adaptor 530 is connected to the abutment by an extension that rotates in a hole. For example, an extension on the adaptor 530 may fit into a hole in the abutment 520 and/or an extension on the abutment 520 may fit into a hole in the adaptor 530.

In some embodiments, the angle between the abutment 520 and the adaptor 530 may be locked. Optionally, the extension may be expandable and/or the hole may be reducible. For example, expanding the width of the extension (for example the diameter of a cylindrical extension) and/or reducing the width of the hole (for example the diameter of a round hole) may lock the angle of rotation between the adaptor 530 and the abutment 520. Alternatively or additionally, the extension and/or the hole may be beveled and/or shaped such that pressing the adaptor into the hole locks the angle of rotation between the adaptor 530 and the abutment 520.

In some embodiments a tightener 510 may be used to lock the angle between the abutment 520 and the adaptor 530. For example, a tightener 510 may connect to the implant 540 and/or press the abutment 520 into the adaptor 530 and/or press the adaptor 530 into the implant 540, locking them together. Alternatively or additionally, a tightener may connect to the adaptor and/or press the abutment into the adaptor, locking them together. For example, the locking may include expanding an extension. For example, the tightener 510 may include a taper. Optionally tightening the tightener wedges the taper into an extension. For example, wedging the taper into the extension may expand the extension locking the abutment 520 to the adaptor 530. For example, the tightener 510 may include a screw thread to tighten it to the implant 540 and/or the adaptor 530. In some embodiments the screw thread may be in a lower part of the tightener. Optionally the lower part of the tightener may pass through a hole in the adaptor and/or a hole in the abutment.

In some embodiments, the matching connectors may include a projection on fitting into a groove. For example a projection of the extension may fit into a groove on the hole and/or a projection from the hole may fit into a groove on the extension. For example, the projection may slide in the groove as the abutment 520 rotates with respect to the adaptor 530. For example, a projection fitting to a groove may form a snap fit between the extension and the hole.

Figure 6:
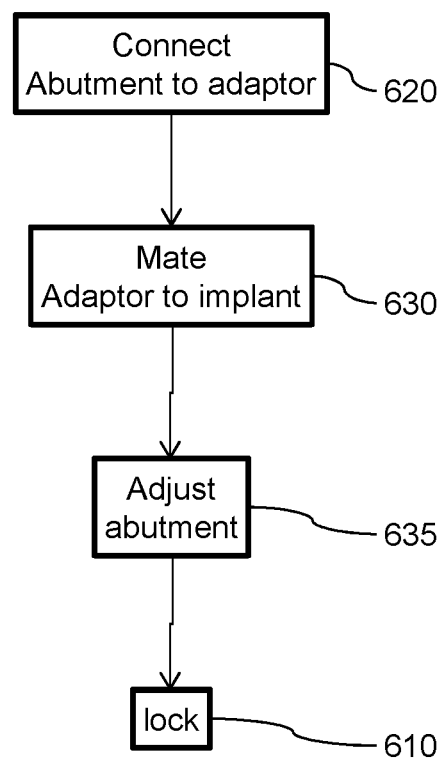
FIG. 6 is a flow chart illustrating a method of mounting a dental prosthesis in accordance with at least one embodiment of the current invention.

FIG. 6 is a flow chart illustrating a method of mounting a dental prosthesis in accordance with at least one embodiment of the current invention.

In some embodiments, an abutment is connected 620 to an adaptor. Optionally, the connection may allow rotation of the abutment with respect to the adaptor. Optionally, the connection fixes the axial position of the abutment with respect to the adaptor. For example a snap may fix the axial position of the abutment with respect to the adaptor. For example, the abutment may rotate with respect to the adaptor around an axis while the adaptor is retained at a fixed position in relation to the abutment along the axis.

In some embodiment, the adaptor may be mated 630 to the adaptor. Optionally, mating may prevent rotation of the adaptor with respect the implant. In some embodiment, the adaptor may be mated 630 to the implant after connecting 620 the abutment to the adaptor. Alternatively or additionally, the adaptor may be connected 620 to the after mating 630 the adaptor to the implant abutment (for example connecting 620 may be performed with the adaptor is in the mouth of a subject).

In some embodiments, an angle between the adaptor and the abutment is adjusted 635. For example, adjusting may be done in the mouth of a patient and/or while the adaptor is mated to the implant and/or while the abutment is connected to the adaptor.

In some embodiments, the angle between the adaptor and the abutment may be locked 610. Optionally, locking 610 includes tightening the abutment to the adaptor and/or securing the adaptor to the implant (for example as described above). Optionally locking 610 includes expanding an extension in a hole (for example as described above). Optionally, the locking may be done while the adaptor and/or the abutment is in the mouth of a subject and/or while the adaptor is mated to the implant.

In some embodiments, the ability of a clinician to adjust an abutment in after installation of the implants may be used to shorten the process of fitting a prosthesis. In some embodiments, clinician will measure a subject for a prosthesis. Based on the measurement, the prosthesis and/or one or more abutments and/or on or more implants may be prepared optionally at the same time. The implants may be installed into the subject and/or the abutments may be installed loosely onto the implants. Optionally the clinician may adjust the abutments to fit the prosthesis. Optionally, afterward, the abutments are tightened and/or the prosthesis if is attached to the abutments. Optionally, the entire process may be performed in a single sitting by a clinician. This may save time over conventional fitting of prosthesis wherein after installing the implants another measurement is made for the abutments and/or the prosthesis. Alternatively or additionally, in some embodiments, the system of the current may be used in an iterative procedure for example wherein the subject is measured after installation of the implants and/or the prosthesis is prepared to fit the position of the implants.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. An adaptor system for mounting a dental prosthesis onto an implant comprising:
   an abutment:
   an adaptor including a mating element adapted to irrotationally fit to the implant;
   a connector configured for connecting the abutment to the adaptor preventing relative linear displacement along an axis of the abutment with respect to the adaptor while allowing rotation of the abutment with respect to the adaptor around the axis;
   a tightener configured to lock said abutment to said adaptor thereby preventing rotation between said adaptor and said abutment,
   wherein said adaptor includes an expanding element and wherein said tightening expands said expanding element against a surface of said abutment and wherein friction between said expanding element and said surface prevents said rotation.

2. The system of claim 1, wherein said abutment includes an attachment surface adapted for attaching to a prosthesis and wherein a shape of said attachment surface varies with an angle of displacement around said axis and wherein said adaptor connects to said abutment opposite said attachment surface.

3. The system of claim 1, wherein said abutment includes a first through hole and said adaptor includes a second through hole and wherein said tightener is configured to pass through said first and second through hole to connect to said implant.

4. The system of claim 3, wherein said tightening expands said expanding element against an inner surface of said first through hole.

5. The system of claim 4, wherein said inner surface is rigid.

6. The system of claim 3, wherein a lower part of said tightener includes a first screw thread configured to connect to a matching screw thread of said implant and wherein said tightening includes tightening said first screw thread to said matching screw thread and wherein said tightener includes a taper on an upper part thereof and wherein said tightening causes said taper to press a surface of said adaptor against the abutment and wherein friction between said surface and said abutment prevents said rotation between said connector and said abutment.

7. An adaptor system for mounting a dental prosthesis onto an implant comprising:
   an abutment:
   an adaptor including a mating element adapted to irrotationally fit to the implant;
   a connector configured for connecting the abutment to the adaptor preventing relative linear displacement along an axis of the abutment with respect to the adaptor while allowing rotation of the abutment with respect to the adaptor around the axis;
   a tightener configured to lock said abutment to said adaptor thereby preventing rotation between said adaptor and said abutment,
   wherein said connector includes at least one member of the group consisting of a protrusion and an annular groove on the adaptor, and wherein said member fits to a matching element on said abutment.

8. The system of claim 7, further comprising:
   a prosthesis configured to attach to a plurality of implants and at least one said abutment and at least one said adaptor for each of said plurality of implants.

9. The system of claim 7, wherein said abutment includes a first through hole and said adaptor includes a second through hole and wherein a lower part of said tightener is configured to pass through said first and second through hole to connect to said implant.

10. The system of claim 9, wherein said adaptor includes an expanding element and wherein said tightening expands said expanding element against an inner surface of said first through hole and wherein friction between said expanding element and said inner surface prevents said rotation.

11. The system of claim 7, wherein said tightener includes a screw thread and wherein said tightening includes tightening said screw thread to the implant.

12. An adaptor system for mounting a dental prosthesis onto an implant comprising:
    an abutment:
    an adaptor including a mating element adapted to irrotationally fit to the implant;
    a connector configured for connecting the abutment to the adaptor preventing relative linear displacement along an axis of the abutment with respect to the adaptor while allowing rotation of the abutment with respect to the adaptor around the axis;
    a tightener configured to lock said abutment to said adaptor thereby preventing rotation between said adaptor and said abutment,
    wherein said abutment includes a through hole and wherein an upper part of said tightener includes a taper and wherein a lower part of said tightener includes a screw thread and wherein said tightening includes tightening said screw thread to the implant to apply pressure from said taper against an inner surface of said through hole.

13. A method of attaching a prosthesis to a dental implant:
    supplying an adaptor and an abutment, the abutment configured for attachment to the prosthesis at a predetermined orientation between the prosthesis and the abutment around an axis of the abutment;
    irrotationally mating the adaptor to the implant;
    connecting the abutment to the adaptor preventing relative movement along said axis of the abutment with while allowing relative rotation between the adaptor and the abutment around the axis;
    rotating the abutment with respect to the adaptor around said axis to a desired orientation;
    tightening the abutment to the adaptor to prevent further rotating of the abutment with respect to the adaptor; and attaching the prosthesis to the abutment in said predetermined orientation;

wherein said tightening the abutment to the adaptor includes simultaneously tightening the adaptor to the implant.

14. The method of claim 13, wherein said connecting includes snapping a protrusion into an annular groove and wherein said rotating includes sliding said protrusion along said annular groove.

15. The method of claim 13, wherein said abutment includes a through hole and wherein said tightening includes inserting a lower end of a tightener through said through hole to form a connection between the tightener and the implant and said tightening includes tightening said connection to apply pressure from an upper flange of said tightener against said through hole thereby preventing said further rotating.

16. The method of claim 13, wherein said connecting the abutment to the adaptor includes inserting an expanding extension into a hole and wherein said tightening includes expanding said expanding extension against an inner surface of the hole and wherein friction between said expanding extension and said inner surface prevents said further rotating.

* * * * *